(12) United States Patent
Aoki

(10) Patent No.: US 6,654,333 B2
(45) Date of Patent: Nov. 25, 2003

(54) CASE BODY WITH FRONT PANEL AND ACOUSTIC APPARATUS FOR VEHICLE USE

(75) Inventor: Masayoshi Aoki, Hachiouji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 10/073,878

(22) Filed: Feb. 14, 2002

(65) Prior Publication Data

US 2002/0121873 A1 Sep. 5, 2002

(30) Foreign Application Priority Data

Mar. 1, 2001 (JP) ........................................ 2001-056888

(51) Int. Cl.⁷ .............................................. G11B 17/04
(52) U.S. Cl. ........................................ 369/75.2; 369/191
(58) Field of Search ............................... 369/75.1, 75.2, 369/77.1, 77.2, 78, 79, 191

(56) References Cited

U.S. PATENT DOCUMENTS 4,655,344 A * 4/1987 Ackeret ........................ 206/307
5,084,855 A * 1/1992 Kobayashi et al. ........... 369/75.2
5,872,757 A * 2/1999 Park ............................. 369/77.1
6,333,911 B1 * 12/2001 Sato et al. ..................... 369/192

* cited by examiner

*Primary Examiner*—Bentsu Ro
(74) *Attorney, Agent, or Firm*—Eric J. Robinson; Robinson Intellectual Property Law Office, P.C.

(57) ABSTRACT

To provide a case body with a front panel that achieves a simplified structure and thus reduction in manufacturing cost, and allows a space in the case body to be effectively used. There is provided a case body with a front panel in which driving means is actuated to thereby cause an attitude of a panel 2 to be successively changed from a first state where the panel 2 is substantially parallel to a front surface of a case body 1, to a second state where the panel 2 substantially horizontally projects forward from the front surface of the case body 1, and to a third state where top and bottom as well as inside and outside of the panel 2 are reversed to the first state, wherein the driving means has a panel driving member 68 pivotably coupled to the panel via a drive shaft 68b, and as the drive shaft 68b moves, the shaft member 3 moves in the groove 4 to pivot the panel 2.

7 Claims, 12 Drawing Sheets

CASE BODY WITH FRONT PANEL AND ACOUSTIC APPARATUS FOR VEHICLE USE

BACKGROUND OF THE INVENTION

1. Field of the Invention

The present invention relates to a case body with a front panel having a panel on a front side of a case body.

2. Related Background Art

Known conventional acoustic apparatuses for vehicle use of this type generally use case bodies with front panels as shown in FIGS. 10 to 12. FIGS. 10 to 12 are side views, partially in perspective, of the case body with a front panel.

This case body with a front panel comprises a box-like case body 201 and an operation panel 202 located on a front side of the case body 201 as shown in FIG. 10. An attitude of the operation panel 202 is successively changed from an operation state of being substantially parallel to a front surface of the case body 201 as shown in FIG. 10, to an EJECT state of substantially horizontally projecting forward from the lower other end of the front surface of the case body 201 as shown in FIG. 11, and to an OFF state where top and bottom as well as inside and outside of the operation panel 202 are reversed to the operation state as shown in FIG. 12. The operation panel 202 is provided, at its top, with a shaft member 203, which is guided by a groove 204 formed to vertically extend in a straight line on the case body 201.

The shaft member 203 is formed into a gear shape, and the operation panel 202 vertically moves while pivoting together with the shaft member 203. In the case body 201, a driving mechanism 205 is provided that transmits a driving force of a motor (not shown) to the operation panel 202.

The driving mechanism 205 comprises a first chassis 206 that is movable forward and backward with respect to the case body 201, a movable part 207 moving forward and backward together with the first chassis 206, and an arm 208 that is pivotably provided on the movable part 207 and pivoted by driving the motor. The first chassis 206 has two shafts 206a, 206b extending laterally, which are respectively inserted in grooves 209a, 209b of a second chassis 209. The movable part 207 has a shaft 207a coupled to the shaft 206a of the first chassis, and a substantially arc-shaped groove 207b in which the shaft 206b is inserted. The grooves 209a, 209b are formed to extend forward and backward, and the driving mechanism 205 (first chassis 206, movable part 207, arm 208, or the like) is movable forward and backward with respect to the case body 201. The arm 208 is rotatably provided with a gear 210, which meshes with the shaft member 203 and also meshes with an arc-shaped gear portion 207c formed on the movable part 207.

In the case body with a front panel, as the arm 208 pivots, the driving mechanism 205 (first chassis 206, movable part 207, arm 208, or the like) moves forward and backward, and the shaft member 203 moves downward in the groove 204 while pivoting, so that the operation panel 202 can be moved from the operation state to the EJECT state, and further moved from the EJECT state to the OFF state.

However, in the above described case body with a front panel, the operation panel is pivoted by means of the gear in the driving mechanism in the case body, which causes problems that the apparatus requires a complex structure such as where the driving mechanism has to be moved forward and backward to thereby result in an increase in manufacturing cost. There is also a problem that a space in the case body cannot be effectively used since a space where the driving mechanism can be moved forward and backward have to be secured in the case body.

SUMMARY OF THE INVENTION

The present invention is achieved in view of the above described circumstances and has the object to provide a case body with a front panel that achieves a simplified structure and thus reduction in manufacturing cost, and allows a space in the case body to be effectively used.

In order to attain the above described object, a first aspect of the present invention provides a case body with a front panel including: a box-like case body 1; a panel (such as an operation panel 2) provided on a front side of the case body; a shaft member 3 provided on the panel; a groove 4 provided on the case body and guiding the shaft member; and driving means (such as a DC motor 5 and a driving mechanism 6) provided in the case body, the driving means being actuated to thereby cause an attitude of the panel to be successively changed from a first state where the panel is substantially parallel to a front surface of the case body, to a second state where one end of the panel moves to the other end of the case body in a vertical direction to cause the panel to substantially horizontally project forward from the other end of the case body, and to a third state where top and bottom as well as inside and outside of the panel are reversed to the first state, wherein the driving means has a panel driving member (such as an oscillation lever 68) pivotably coupled to the panel via a drive shaft (such as a third shaft 68b) in a position remote from the shaft member, driving the panel driving member causes the drive shaft to move and also causes the shaft member to move in the groove to pivot the panel, and the groove is continuously formed with a first guide passage 4a guiding the shaft member so as to move the panel from the first state to the second state, and a second guide passage 4b guiding the shaft member so as to move the panel from the second state to the third state.

According to the first aspect of the present invention, when the panel is moved from the first state to the second state, and from the second state to the third state, the shaft member moves in the respective guide passages, and the drive shaft also moves by operation of the panel driving member, causing positions of the shaft member and the drive shaft to be changed with respect to the case body to pivot the panel. The panel moves differently between when the shaft member moves in the first guide passage and when the shaft member moves in the second passage, but the first guide passage and the second guide passage are continuously formed, so that continuous movement of the shaft member from the first guide passage to the second guide passage allows the panel to be continuously moved from the first state to the third state.

Therefore, there is no need for providing a gear that pivots a panel as is conventional, and no need for moving a driving mechanism having the gear forward and backward, thereby achieving an especially simplified structure and thus reduction in manufacturing cost. Further, there is no need for securing a space for forward and backward movement of the driving mechanism in the case body to thereby allow a space in the case body to be effectively used.

A second aspect of the present invention provides the case body with a front panel in the first aspect, wherein a guide passage switching mechanism 7 is provided that controls entrance of the shaft member into the second guide passage when the panel moves from the first state to the second state, and that controls entrance of the shaft member into the first guide passage when the panel moves from the second state to the third state.

According to the second aspect of the present invention, in addition to an operation in the first aspect, the shaft member does not enter into the second guide passage when the panel is moved from the first state to the second state. Also, the shaft member does not enter into the first guide passage when the panel is moved from the second state to the third state. Thus, the panel can be surely moved from the first state to the second state, and from the second state to the third state.

A third aspect of the present invention provides the case body with a front panel in the second aspect, wherein the guide passage switching mechanism has a control member (such as a second lever 71, a third lever 72) that controls movement of the shaft member, and the control member is driven by the driving means and controls the entrance of the shaft member into each of the guide passages in an interlocked manner with the panel driving member.

According to the third aspect of the present invention, in addition to an operation in the second aspect, the control member driven by the driving means controls the entrance of the shaft member into the second guide passage in an interlocked manner with the panel driving member when the panel is moved from the first state to the second state. Also, the control member driven by the driving means controls the entrance of the shaft member into the first guide passage in an interlocked manner with the panel driving member when the panel is moved from the second state to the third state.

This allows driving means for the panel to be also used as a mechanism for driving the control member to result in reduction in a component count and thus reduction in manufacturing cost. Further, switching of the guide passages by the control member can be synchronized with movement of the shaft member from the first guide passage to the second guide passage, thereby assuring exact timing of switching of the guide passages.

A fourth aspect of the present invention provides the case body with a front panel in any one the first to third aspects, wherein the panel driving member is oscillatably provided, and oscillation of the panel driving member causes the panel to move.

According to the fourth aspect of the present invention, in addition to an operation in any one of the first to third aspects, oscillation of the panel driving member reduces movement of the panel driving member compared to a panel driving member with more than one turn, and thus there is no need for securing a large space for movement of the panel driving member in the case body, thereby allowing the space in the case body to be further effectively used.

A fifth aspect of the present invention provides the case body with a front panel in the fourth aspect, wherein the panel driving member oscillates with forward and reverse pivoting in such a manner that the forward pivoting of the panel driving member causes the panel to move from the first to the second state, and that the reverse pivoting of the panel driving member causes the panel to move from the second to the third state.

According to the fifth aspect of the present invention, in addition to an operation in the fourth aspect, the panel moves differently between when the panel moves from the first state to the second state and when the panel moves from the second state to the third state, but matching the respective movements of the panel with the forward movement and the reverse movement in oscillation of the panel driving member allows the panel to be surely and smoothly moved.

A sixth aspect of the present invention provides a case body with a front panel including: a box-like case body 101; a panel (such as an operation panel 102) provided on a front side of the case body; a shaft member 103 provided on the panel; a groove 104 provided on the case body side and guiding the shaft member; and driving means provided in the case body, the driving means being actuated to thereby cause the panel to substantially vertically move while pivoting, and cause an attitude of the panel to be changed from a first state where the panel is substantially parallel to a front surface of the case body, to a second state where one end of the panel moves to the other end of the case body in a vertical direction to cause the panel to substantially horizontally project forward from the other end of the case body, wherein the driving means has a panel driving member (such as a lever) pivotably coupled to the panel via the drive shaft 105a in a position remote from the shaft member, the groove is continuously formed with a first guide passage 104a guiding the shaft member so as to move the panel from the first state to the second state, and a second guide passage 104b guiding the shaft member so as to move the panel from the second state to the third state where the panel is substantially horizontally held in the case body at the other end thereof in a vertical direction, and a guide passage switching mechanism is provided that controls entrance of the shaft member into the second guide passage when the panel moves from the first state to the second state, and that controls entrance of the shaft member into the first guide passage when the panel moves from the second state to the third state.

According to the sixth aspect of the present invention, the panel moves differently between when the shaft member moves in the first guide passage and when the shaft member moves in the second passage, but the first guide passage and the second guide passage are continuously formed, so that continuous movement of the shaft member from the first guide passage to the second guide passage allows the panel to be continuously moved from the first state to the third state. The shaft member does not enter into the second guide passage when the panel is moved from the first state to the second state. Also, the shaft member does not enter into the first guide passage when the panel is moved from the second state to the third state. Thus, the panel can be surely moved from the first state to the second state, and from the second state to the third state. Further, there can be achieved an especially simplified structure compared to a conventional structure and thus reduction in manufacturing cost, and there is no need for securing a space for movement of the driving mechanism in the case body to thereby allow a space in the case body to be effectively used.

A seventh aspect of the present invention provides an acoustic apparatus for vehicle use using the case body with a front panel in any one of the first to sixth aspects, wherein the case body is fixable to a vehicle with its front surface inward, and can hold a recording medium inserted from an insertion port provided on the front surface, and the panel has an operation section and a display section.

According to the seventh aspect of the present invention, a space required for operation of the driving means in the case body can be reduced to allow a limited space in the case body to be effectively used, thereby providing significant advantages in practical use such as a larger capacity of the case body for recording media.

DETAILED DESCRIPTION OF THE PREFERRED EMBODIMENTS

FIGS. 1 to 6 show a first embodiment of the present invention, and are side views, partially in perspective, of a case body with a front panel.

Figure 1:
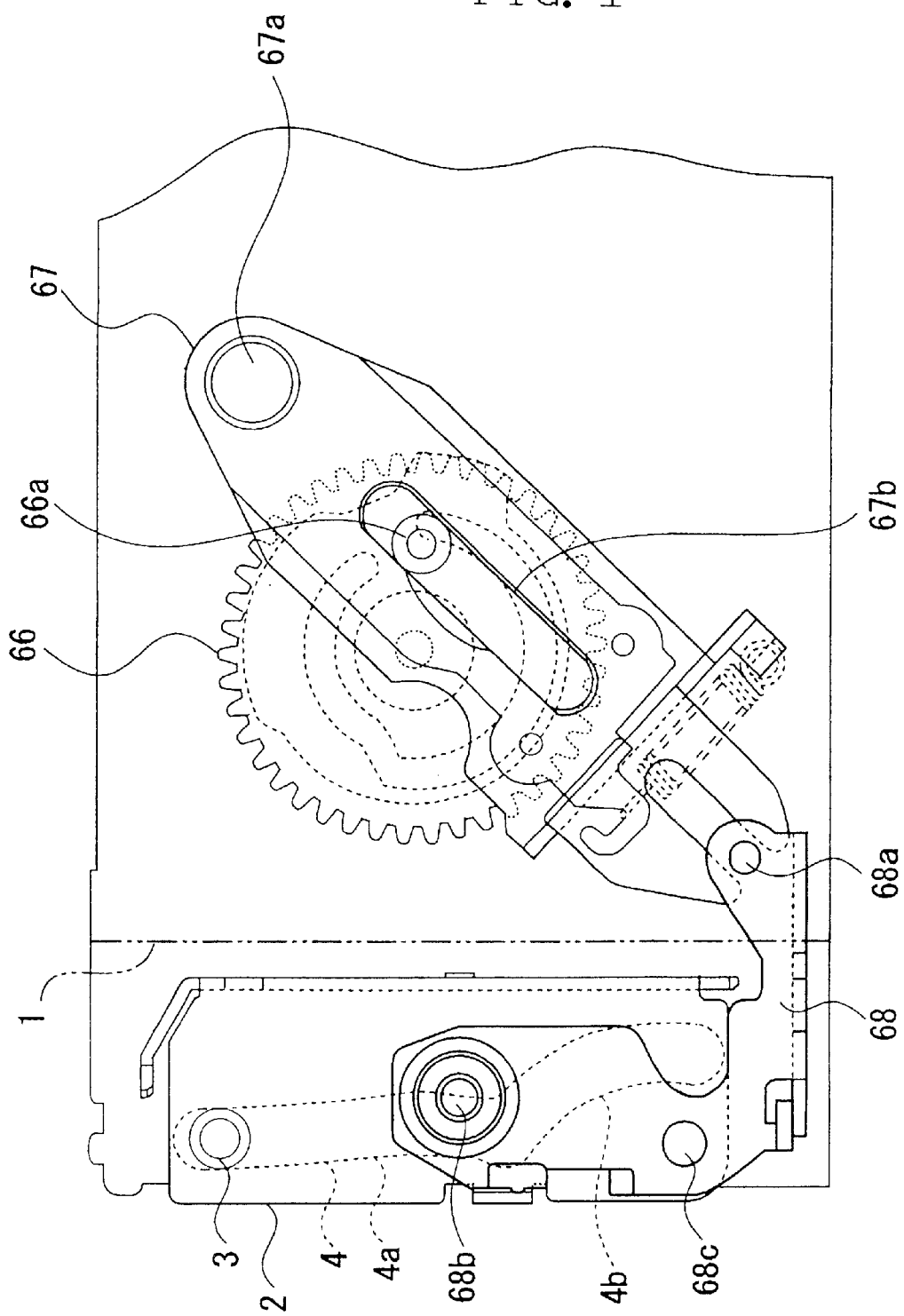
FIG. 1 shows a first embodiment of the present invention, and is a side view, partially in perspective, of a case body with a front panel, illustrating an operation state of an operation panel.
Figure 4:
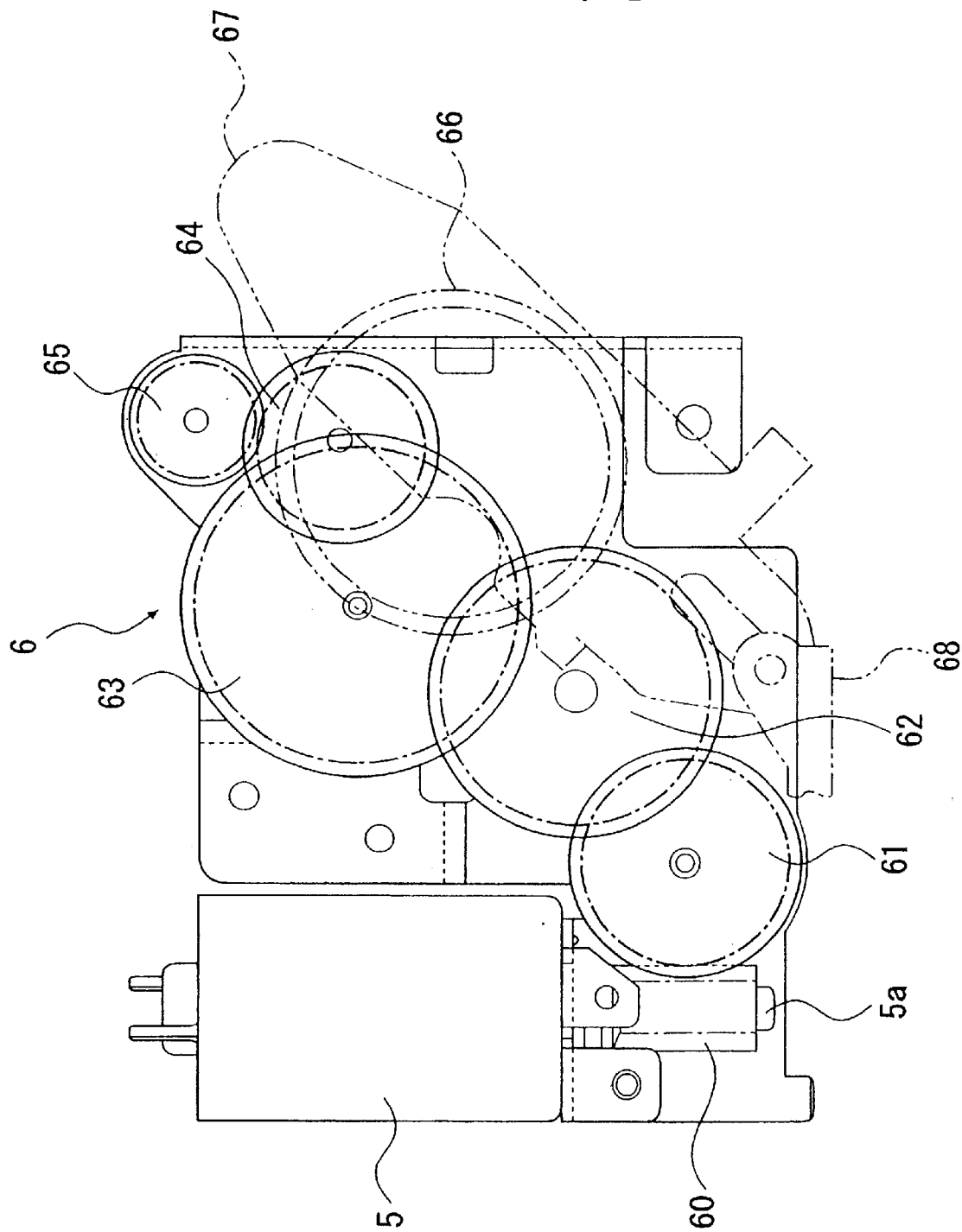
FIG. 4 is a side view, partially in perspective, of the case body with a front panel, mainly illustrating a driving mechanism.

The case body with a front panel is used, for example, for an acoustic apparatus for vehicle use, and comprises a box-like case body 1 and an operation panel 2 located on a front side of the case body 1 as shown in FIG. 1. The operation panel 2 is provided, at its top, with a shaft member 3, which is guided by a groove 4 formed on the case body 1. As shown in FIG. 4, a DC motor 5 is arranged in the case body 1, and a driving mechanism 6 is provided that transmits a driving force of the DC motor 5 to the operation panel 2. That is, the DC motor 5 and the driving mechanism 6 form driving means in this embodiment.

The case body 1 is mounted to an instrument panel of a vehicle with its front surface inward, and can hold a recording medium such as CD (Compact Disk) or MD (Mini Disk) inserted from an insertion port (not shown) formed on the front surface.

The operation panel 2 has an operation section, a display section, or the like, and, as shown in FIG. 1, is substantially parallel to the front surface of the case body 1 so as to cover most of the front surface of the case body 1 in an operation state where a user operates the apparatus. The driving mechanism 6 is actuated to thereby cause an attitude of the operation panel 2 to be successively changed to an EJECT state (see FIG. 2) where an upper side of the operation panel 2 moves downward to cause a lower side thereof to project forward such that the operation panel 2 becomes substantially horizontal, and to an OFF state (see FIG. 3) where top and bottom as well as inside and outside of the operation panel 2 are reversed to the operation state.

In the operation state shown in FIG. 1, the shaft member 3 is provided at an upper portion of the operation panel 2 and inserted in the groove 4. That is, the operation panel 2 moves as the shaft member 3 moves in the groove 4.

The groove 4 is formed to substantially vertically extend on the front side of the case body 1. The groove 4 is continuously formed with a first guide passage 4a formed from a top to a center and a second guide passage 4b formed from the center to a bottom. Each of the guide passages 4a, 4b is curved to have a recess on a front side, and in this embodiment, the second guide passage 4b has a sharper curve than the first guide passage 4a.

The DC motor 5 has an output shaft 5a in its lower portion, for example as shown in FIG. 4, and the output shaft 5a is arranged to rotate around a vertically extending rotation shaft.

Figure 3:
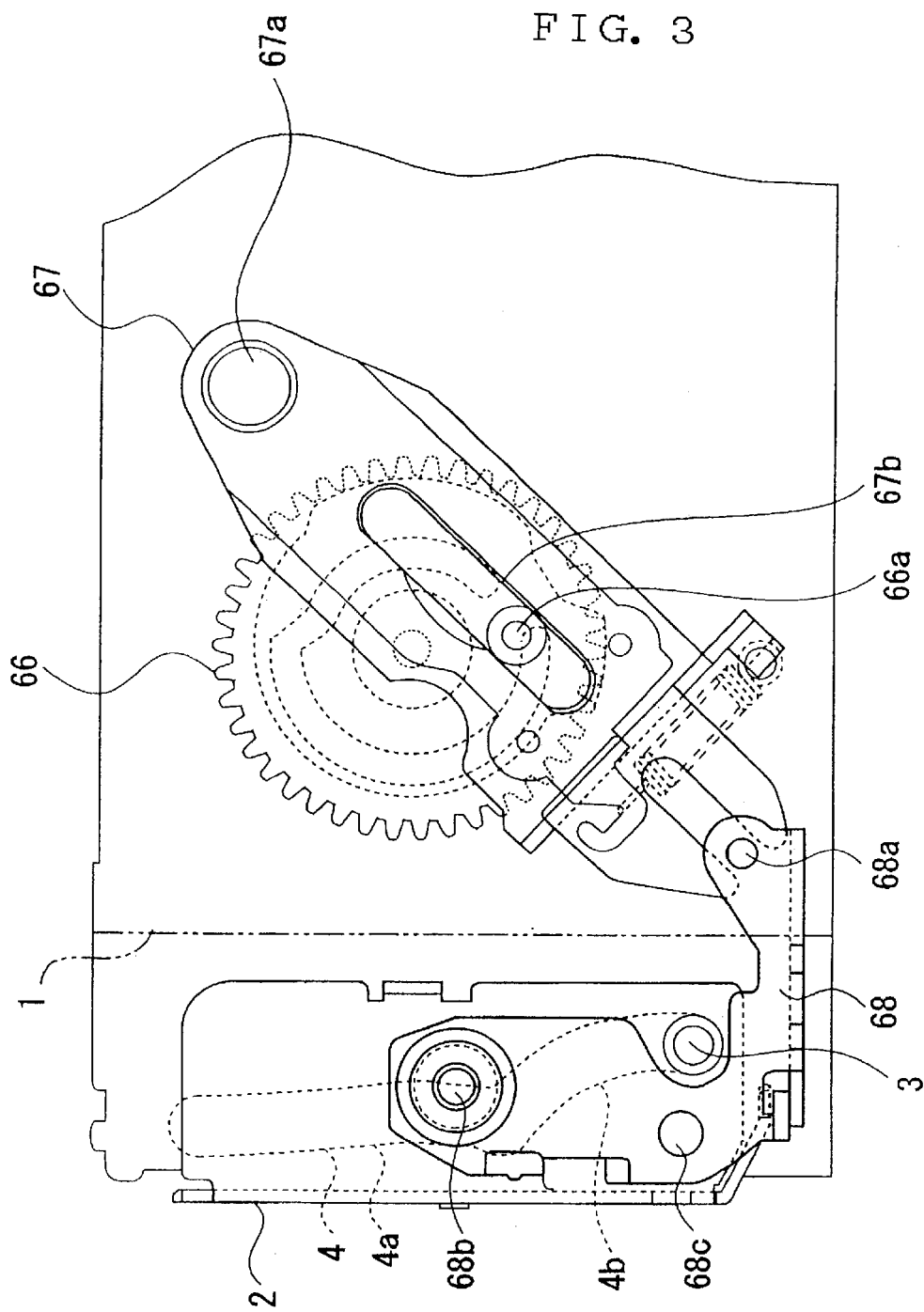
FIG. 3 is a side view, partially in perspective, of the case body with a front panel, illustrating an OFF state of the operation panel.

The driving mechanism 6 has a first gear 60 provided on the output shaft 5a and rotating in an interlocked manner therewith, and a second gear 61 meshing with the first gear 60 and rotating around a laterally extending rotation shaft. The driving mechanism 6 has a third gear 62 meshing with the second gear 61, a fourth gear 63 meshing with the third gear 62, a fifth gear 64 meshing with the fourth gear 63, a sixth gear 65 meshing with the fifth gear 64, and a seventh gear 66 meshing with the sixth gear, and the third to seventh gears 62, 63, 64, 65, 66 rotate around respective rotation shafts extending laterally. The seventh gear 66 is provided with a first shaft 66a laterally extending at an off-center position remote from its central shaft. The driving mechanism 6 has an oscillation arm 67 and an oscillation lever 68 that transmit a driving force of the seventh gear 66 to the operation panel 2. The oscillation arm 67 has a pivot shaft 67a on a rear upper side of the seventh gear 66, and is formed to extend from a pivot shaft 67a side to a seventh gear 66 side. As shown in FIG. 3, for example, the oscillation arm 67 has an arm groove 67b longitudinally extending and guiding the first shaft 66a, and oscillates as the seventh gear 66 rotates. The oscillation lever 68 as a panel driving member is formed into substantially L shape, with one end thereof being pivotably coupled to the oscillation arm 67 via a second shaft 68a, and with the other end thereof being pivotably coupled to the operation panel 2 via a third shaft 68b as a drive shaft. In this embodiment, the second arm 67a is coupled to an end of the oscillation arm 67 on the seventh gear 66 side, and the third shaft 68b is coupled to a substantially vertically central position of the operation panel 2 in the operation state. The oscillation lever 68 is arranged with one end thereof being substantially parallel to the panel in the operation state, has a pivot shaft 68c near a corner in a substantial center thereof, and oscillates together with the oscillation arm 67. The oscillation lever 68 is arranged to move the operation panel 2 to the EJECT state by forward movement and to the OFF state by reverse movement.

Figure 5:
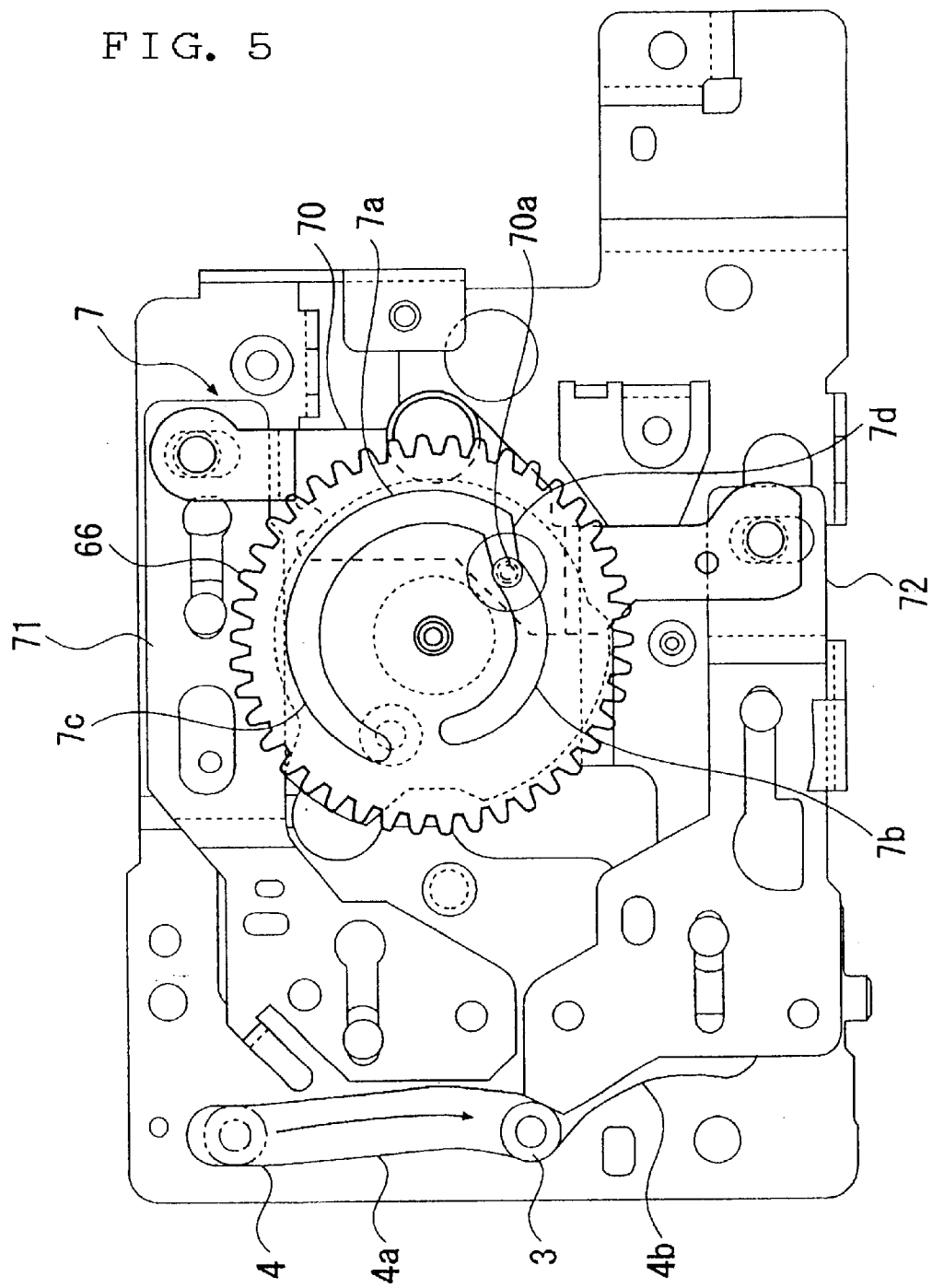
FIG. 5 is a side view, partially in perspective, of the case body with a front panel, illustrating a state of controlling a second guide passage of a shaft member.

As shown in FIG. 5, a guide passage switching mechanism 7 is provided that selectively controls entrance of the shaft member 3 into the first guide passage 4a and the second guide passage 4b as the seventh gear 66 rotates.

Figure 6:
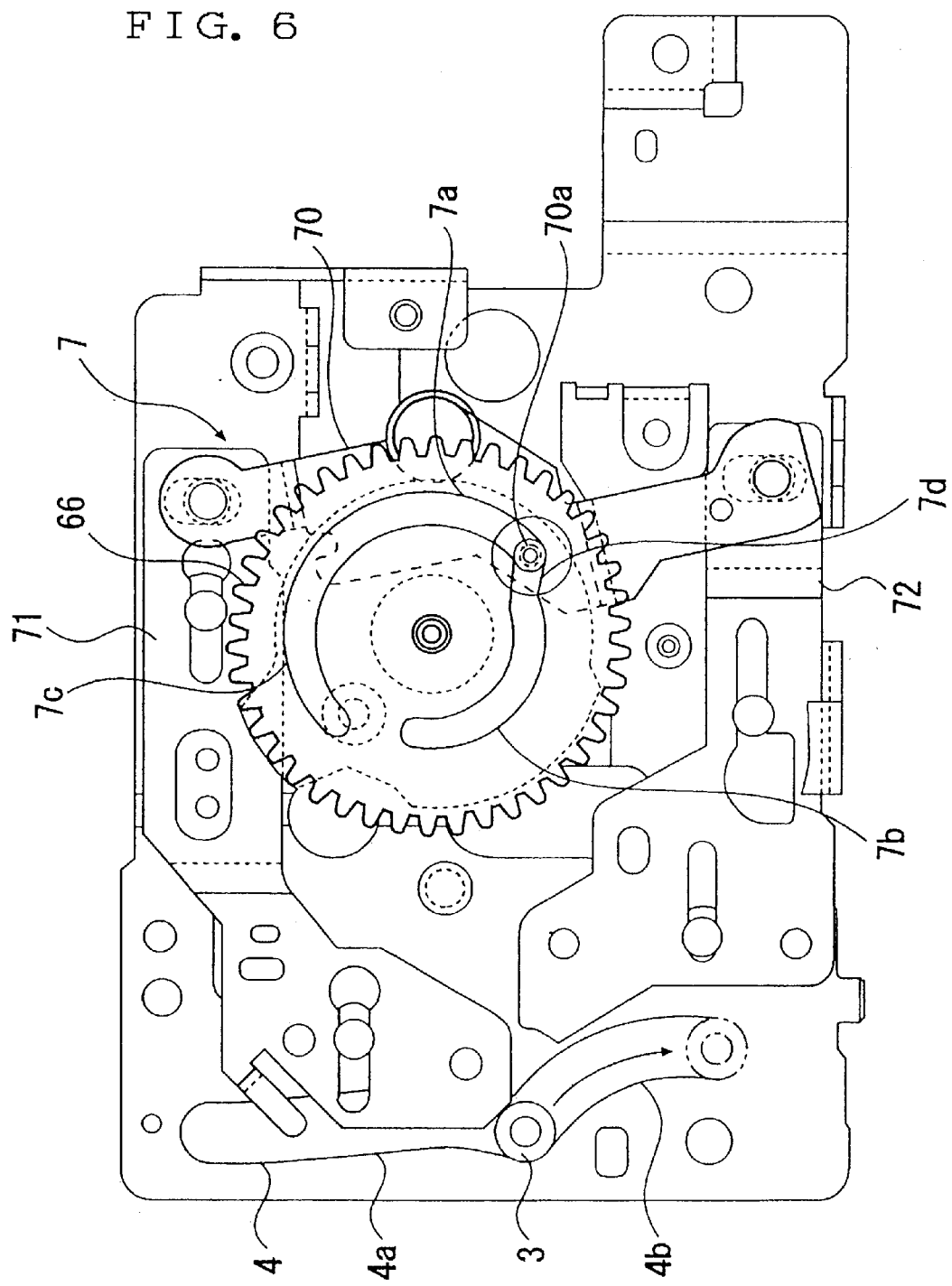
FIG. 6 is a side view, partially in perspective, of the case body with a front panel, illustrating a state of controlling a first guide passage of the shaft member.

The guide passage switching mechanism 7 has a first lever 70 coupled to the seventh gear 66, and a second lever 71 and a third lever 72 that are pivotably coupled to respective ends of the first lever 70 and are movable forward and backward. The second lever 71 as a control member is coupled to an upper end of the first lever 70, and the third lever 72 as a control member is coupled to a lower end of the first lever 70. The first lever 70 is located behind the rotation shaft of the seventh gear 66 so as to vertically extend. The seventh gear 66 is formed with a switching groove 7a circumferentially extending and having a predetermined length, and the first lever 70 is formed with a projecting boss 70a to be inserted in the switching groove 7a. The switching groove 7a has a first section 7b and a second section 7c with different radiuses of curvature, and has a switching section 7d with a continuously varying radius of curvature between the first section 7b and the second section 7c. The boss 70a moves in the switching groove 7a as the seventh gear 66 rotates, and the upper end and the lower end of the first lever 70 are in different positions in forward and backward directions between when the boss 70a is positioned in the first section 7b and when it is positioned in the second section 7c. When the boss 70a is positioned in the first section 7b, the upper end of the first lever 70 is positioned backward, and the lower end thereof is positioned forward. As shown in FIG. 6, when the boss 70a is positioned in the second section 7c, the upper end of the first lever 70 is positioned forward, and the lower end thereof is positioned backward. Specifically, the second lever 71 and the third lever 72 move forward and backward as the upper end and the lower end of the first lever 70 move. The second lever 71 is arranged to be positioned on a side of the first guide passage 4a when moved forward, where the second lever 71 controls entrance of the shaft member 3 into the first guide passage 4a. Similarly, the third lever 72 is arranged to be positioned on a side of the second guide passage 4b when moved forward, where the third lever 72 controls entrance of the shaft member 3 into the second guide passage 4b. That is, the levers 71 and 72 move as the seventh gear 66 rotates like the oscillation lever 68, so that the levers 71, 72 and the oscillation lever 68 are interlocked. The second lever 71 controls the first guide passage 4a when the oscillation lever 68 pivots in the forward direction, and the third lever 71 controls the second guide passage 4b when the oscillation lever 68 pivots in the reverse direction.

Operations when successively moving the operation panel 2 from the operation state to the EJECT state, and to the OFF state in the case body with a front panel configured as described above will be described.

Figure 2:
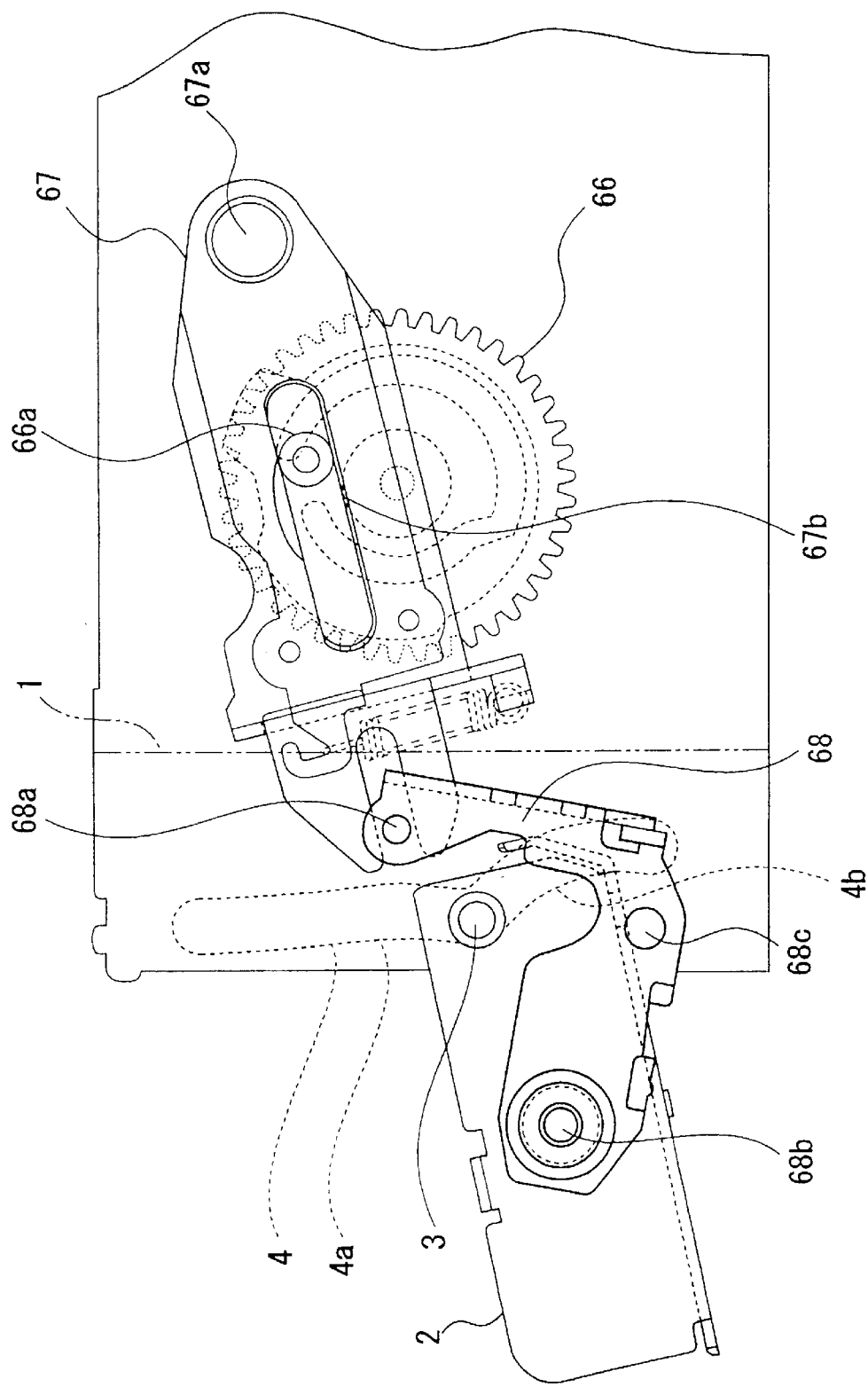
FIG. 2 is a side view, partially in perspective, of the case body with a front panel, illustrating an EJECT state of the operation panel.

In the operation state in FIG. 1, the DC motor 5 is actuated to cause the output shaft 5a to rotate, and thereby cause the first to seventh gears 60, 61, 62, 63, 64, 65, 66 to rotate. As the seventh gear 66 rotates, the oscillation arm 67 and the oscillation lever 68 oscillate, and the shaft member 3 of the operation panel 2 moves downward in the first guide passage 4a. At this time, positions of the shaft member 3 and the third shaft 68b are changed with respect to the case body 1 to cause the operation panel 2 to pivot. Therefore, when the shaft member 3 reaches the lower end of the first guide passage 4a, the upper side of the operation panel 2 moves downward to cause its lower side to project forward, and the operation panel 2 enters the EJECT state where it becomes substantially horizontal as shown in FIG. 2. At this time, as shown in FIG. 5, the boss 70a of the oscillation arm 67 is positioned in the first section 7b, and the third lever 72 controls entrance of the shaft member 3 into the second guide passage 4b. When the seventh gear 66 further rotates from the EJECT state, as shown in FIG. 6, the boss 70a reaches the second section 7c via the switching section 7d, which releases the control of the entrance of the shaft member 3 into the second guide passage 4b by the third lever 72, and controls entrance of the shaft member 3 into the first guide passage 4a by the second lever 71. Thus, the shaft member 3 moves from the upper end to the lower end of the second guide passage 4b. Also at this time, the positions of the shaft member 3 and the third shaft 68b are changed with respect to the case body 1 to cause the operation panel 2 to pivot. When the shaft member 3 reaches the lower end of the second guide passage 4b, the operation panel 2 enters the OFF state where the top and bottom as well as the inside and outside thereof are reversed to the operation state as shown in FIG. 3.

As described above, according to the case body with a front panel of this embodiment, the first guide passage 4a and the second guide passage 4b are continuously formed to cause the operation panel 2 to be moved from the operation state to the EJECT state, and to the OFF state, and the positions of the shaft member 3 and the third shaft 68b are changed to cause the operation panel 2 to pivot. Thus, there is no need for providing a gear that directly pivots an operation panel as is conventional, and no need for moving a driving mechanism having the gear forward and backward, thereby achieving an especially simplified structure and thus reduction in manufacturing cost. Further, there is no need for securing a space for forward and backward movement of the driving mechanism in the case body to thereby allow a space in the case body to be effectively used.

The guide passage switching mechanism 7 is provided that selectively controls the entrance of the shaft member 3 into the guide passages 4a, 4b, and thus the panel can be surely moved from the operation state to the EJECT state, and from the EJECT state to the OFF state.

The second lever 71 and the third lever 72 interlocking with the driving mechanism 6 selectively control the entrance of the shaft member 3 into the guide passages 4a, 4b, thereby allowing the driving mechanism 6 for the panel to be also used as a mechanism for driving the levers 71, 72 to result in reduction in a component count and thus reduction in manufacturing cost. Further, switching of the guide passages 4a, 4b by the levers 71, 72 can be synchronized with movement of the shaft member 3 from the first guide passage 4a to the second guide passage 4b, thereby assuring exact timing of switching of the guide passages 4a, 4b.

Oscillation of the oscillation lever 68 causes the operation panel 2 to move, which reduces movement of the lever compared to a lever for driving a panel with more than one turn, and thus there is no need for securing a large space for movement of the oscillation lever 68 in the case body 1, thereby allowing the space in the case body to be further effectively used.

The operation panel 2 moves differently between when the operation panel 2 moves from the operation state to the EJECT state and when the operation panel 2 moves from the EJECT state to the OFF state, but matching the respective movements of the operation panel 2 with the forward movement and the reverse movement in oscillation of the oscillation lever 68 allows the operation panel 2 to be surely and smoothly moved.

The case body for a front panel is used for the acoustic apparatus for vehicle use, so that a space required for the driving mechanism 6 in the case body 1 can be reduced to allow a limited space in the case body 1 to be effectively used, thereby providing significant advantages in practical use such as a larger capacity for recording media.

In the above described embodiment, there is shown a structure where the groove 4 is substantially vertically formed and the first guide passage 4a and the second guide passage 4b are curved, but the groove and each guide passage may be naturally formed into different shapes from the shapes in the embodiment as long as the operation panel 2 is configured to pivot as the shaft member 3 moves.

In the above described embodiment, there is shown a structure where the driving mechanism 6 for the panel causes the second lever 71 and the third lever 72 to move, but a solenoid or the like may be used to cause the second lever and the third lever to move.

In the above described embodiment, there is shown a structure where the second lever 71 and the third lever 72 as the control members move forward and backward to thereby selectively control the guide passages 4a, 4b, but for example, one control member may pivot to thereby selectively control the guide passages.

Figure 7:
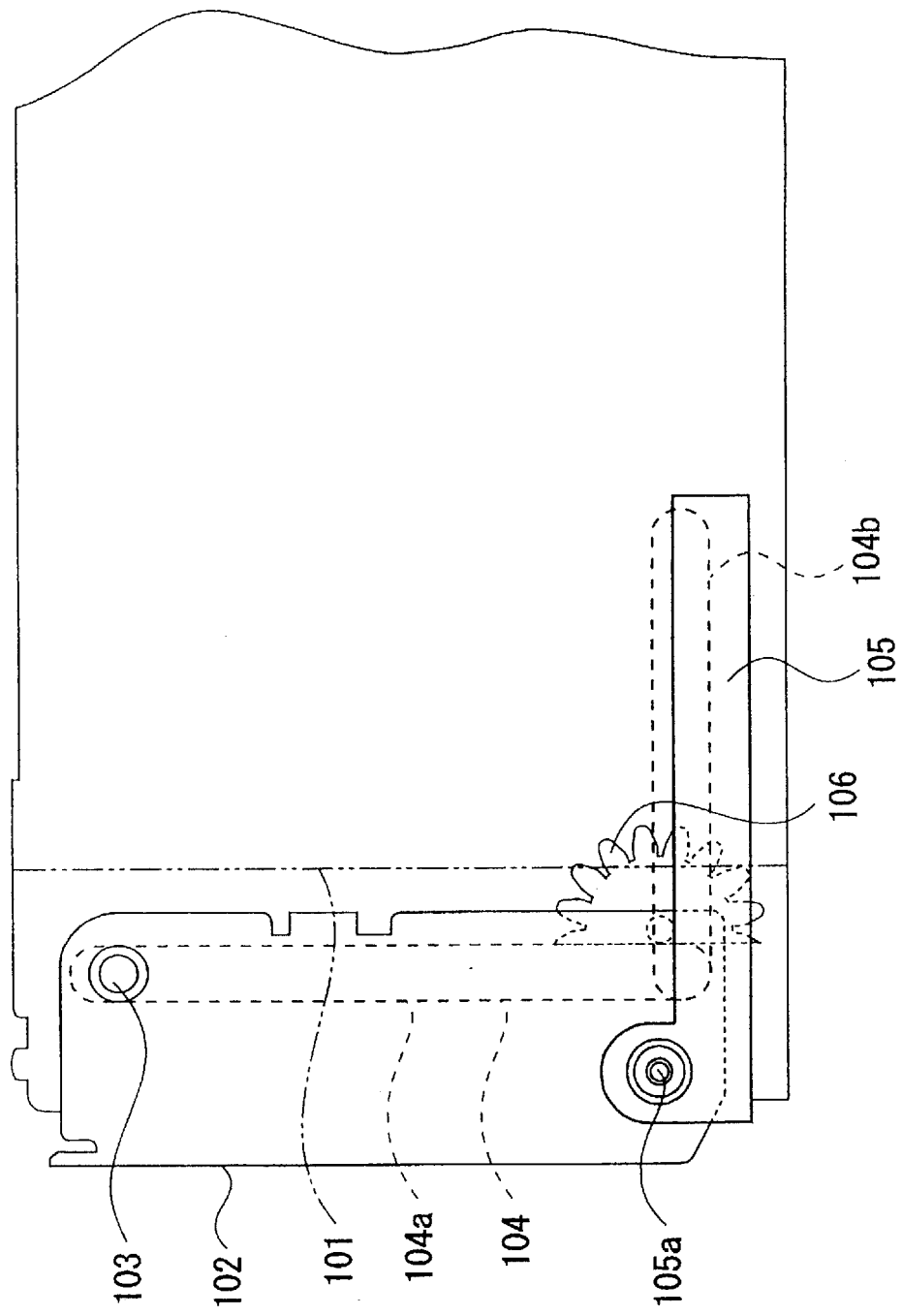
FIG. 7 shows a second embodiment of the present invention, and is a side view, partially in perspective, of a case body with a front panel, illustrating an operation state of an operation panel.
Figure 8:
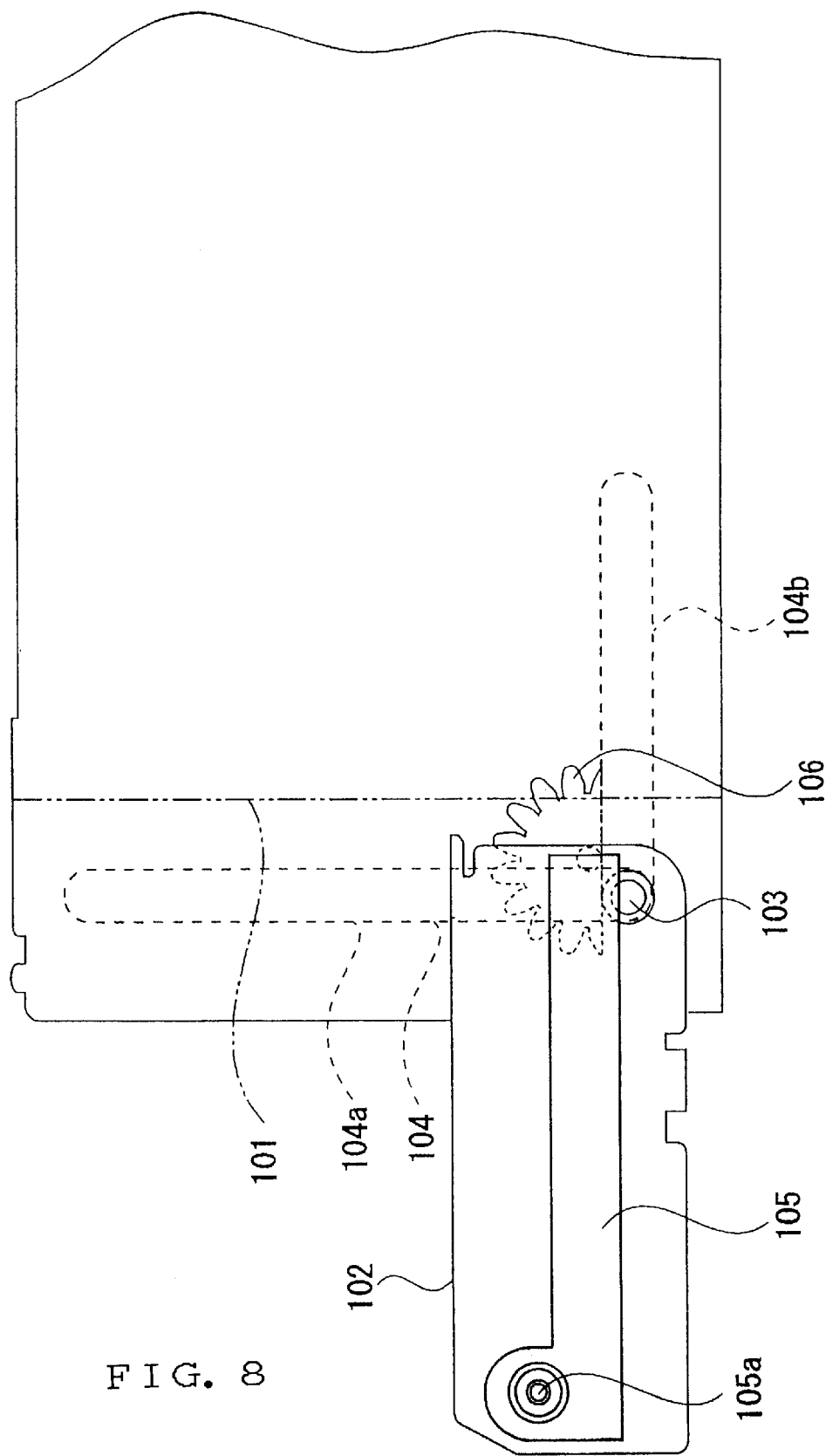
FIG. 8 is a side view, partially in perspective, of the case body with a front panel, illustrating an EJECT state of the operation panel.
Figure 9:
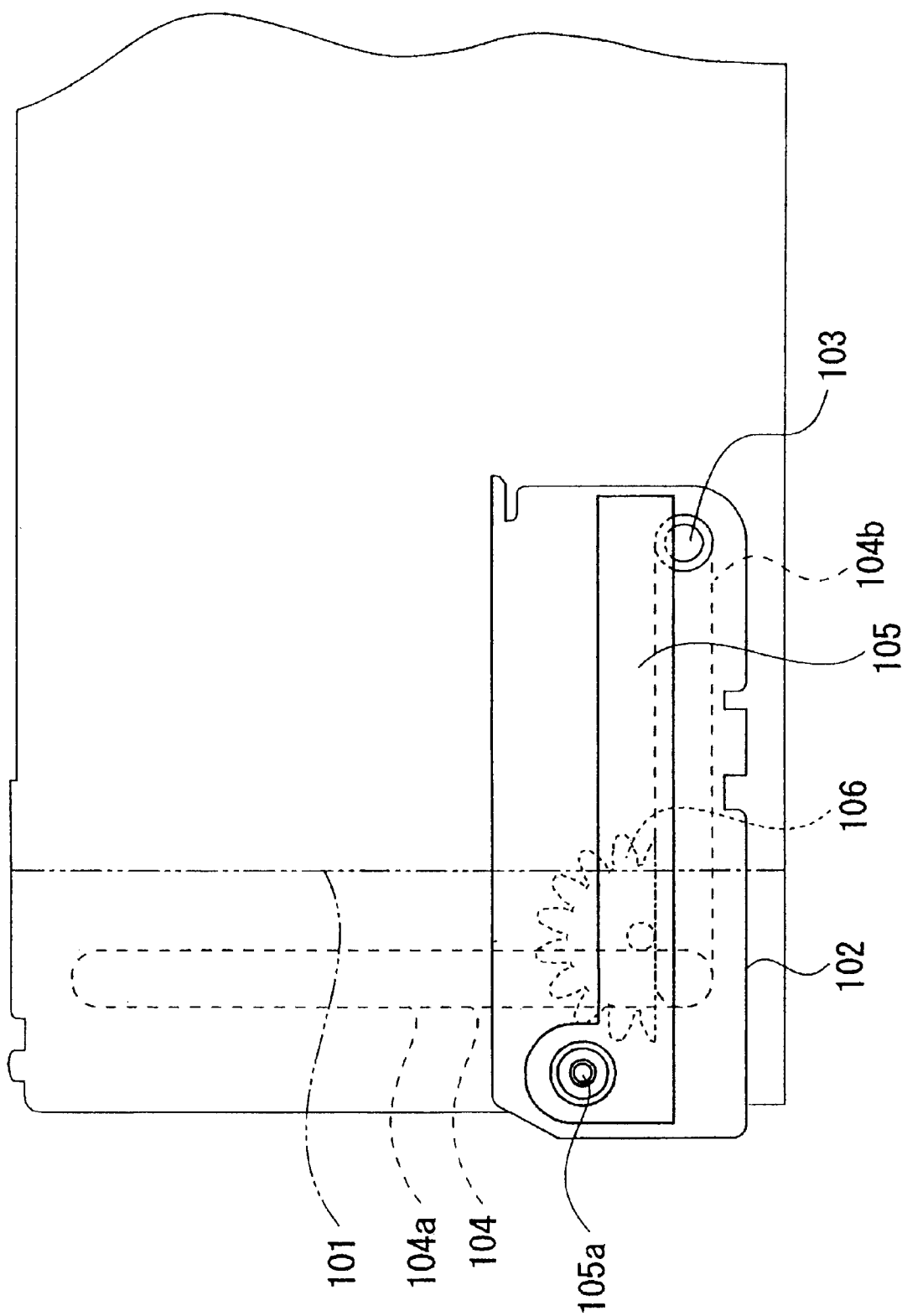
FIG. 9 is a side view, partially in perspective, of the case body with a front panel, illustrating an OFF state of the operation panel.
Figure 10:
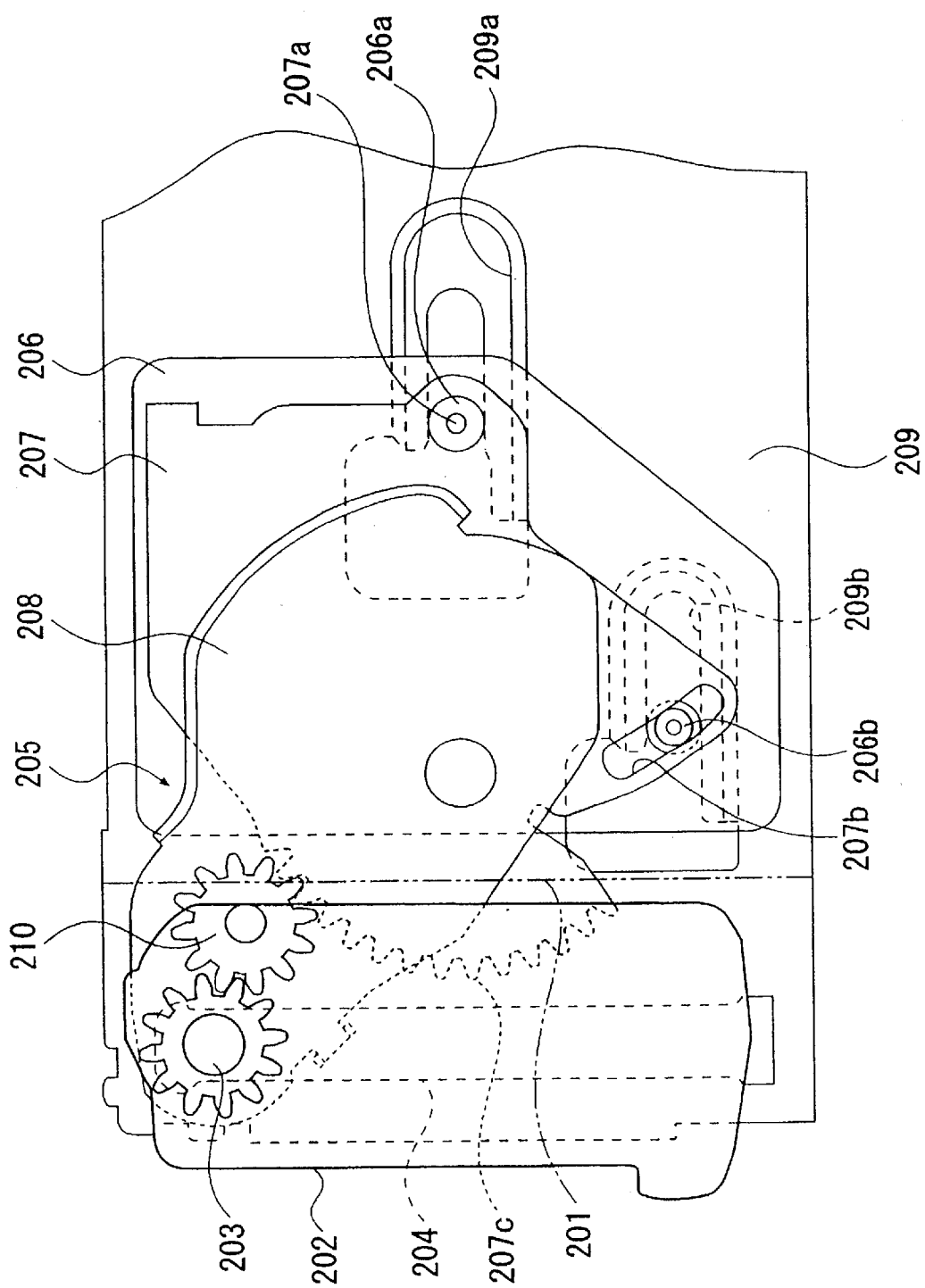
FIG. 10 shows a conventional example, and is a side view, partially in perspective, of a case body with a front panel, illustrating an operation state of an operation panel.
Figure 11:
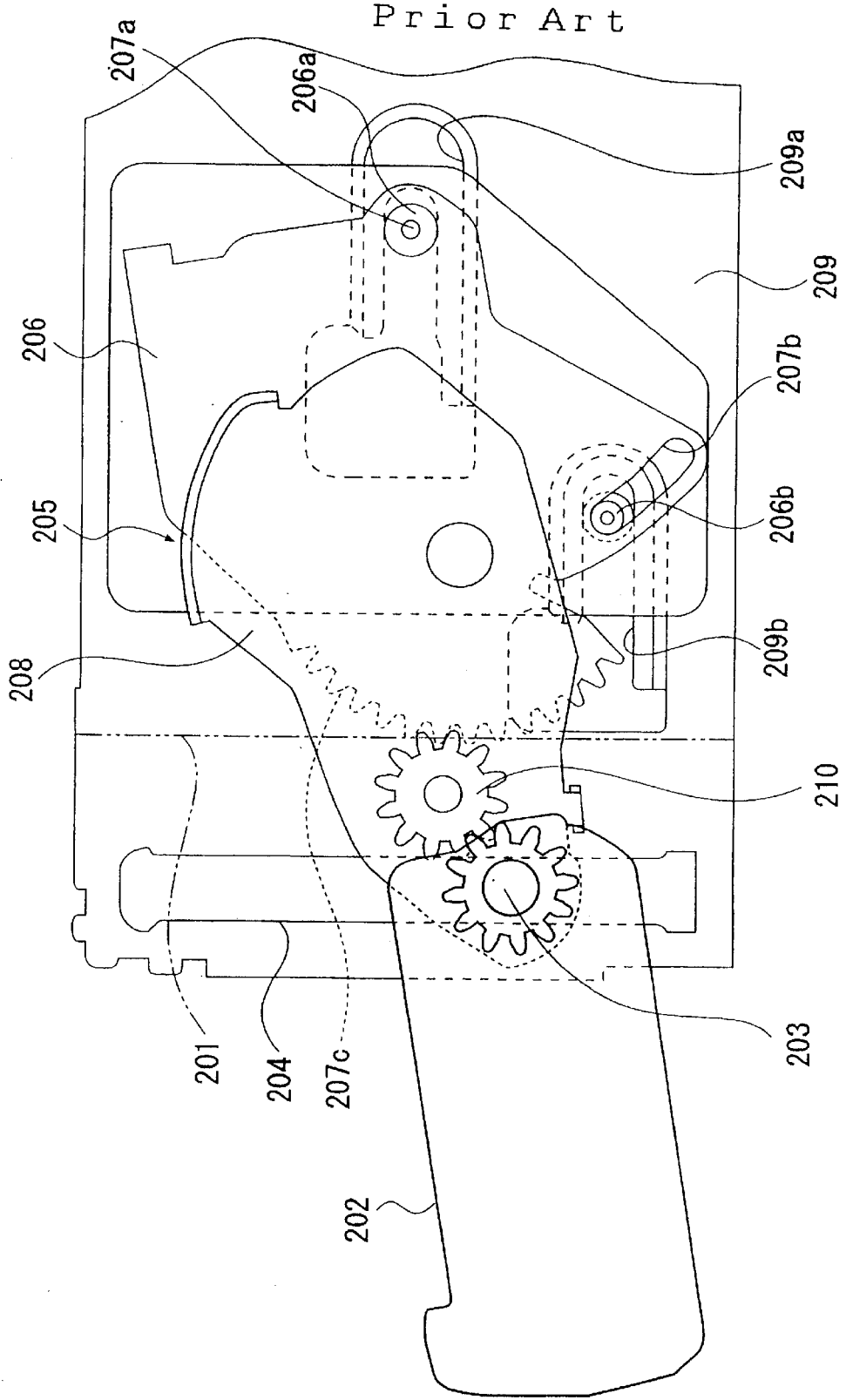
FIG. 11 is a side view, partially in perspective, of the case body with a front panel of the conventional example, illustrating an EJECT state of the operation panel.
Figure 12:
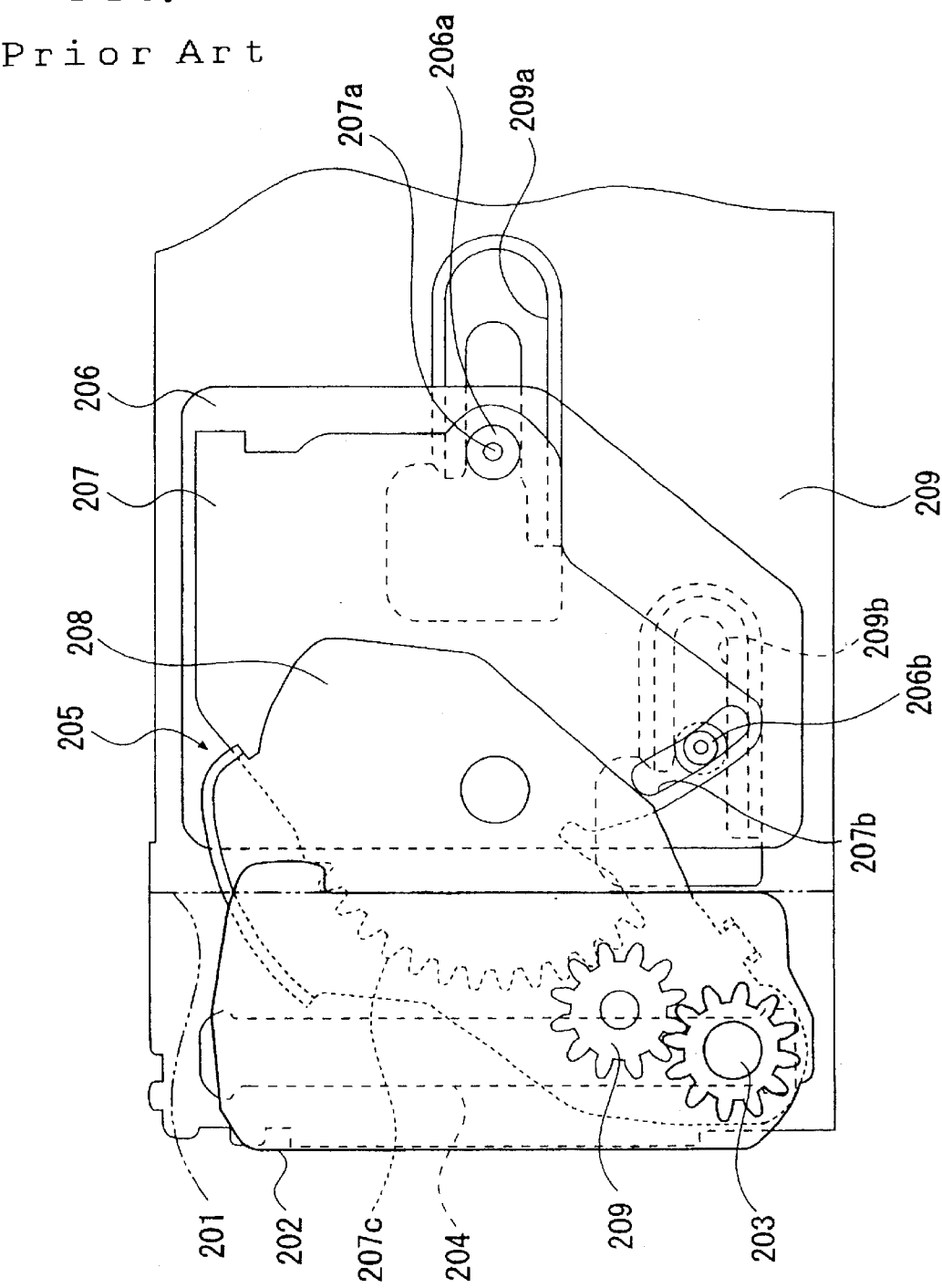
FIG. 12 is a side view, partially in perspective, of the case body with a front panel of the conventional example, illustrating an OFF state of the operation panel.

FIGS. 7 to 9 show a second embodiment of the present invention, and are side views, partially in perspective, of a case body with a front panel.

The case body with a front panel is used, for example, for an acoustic apparatus for vehicle use, and comprises a box-like case body 101 and an operation panel 102 located on a front side of the case body 101 as shown in FIG. 7. The operation panel 102 is provided, at its top, with a shaft member 103, which is guided by a groove 104 formed on the case body 101. A DC motor (not shown) is arranged in the case body 101, and a driving mechanism that is provided that transmits a driving force of the DC motor to the operation panel 102. That is, the DC motor and the driving mechanism form driving means in this embodiment.

The case body 101 is mounted to an instrument panel of a vehicle with its front surface inward, and can hold a recording medium such as CD (Compact Disk) or MD (Mini Disk) inserted from an insertion port (not shown) formed on the front surface.

The operation panel 102 has an operation section, a display section, or the like, and, as shown in FIG. 7, is substantially parallel to the front surface of the case body 101 so as to cover most of the front surface or the case body 101 in an operation state where a user operates the apparatus. The driving mechanism is actuated to thereby cause an attitude of the operation panel 2 to be successively changed to an EJECT state (see FIG. 8) where an upper side of the operation panel 102 moves downward to cause a lower side thereof to project forward such that the operation panel 102 becomes substantially horizontal, and to an OFF state (see FIG. 9) where the operation panel 102 is substantially horizontally held in the case body 101 at a lower end thereof.

The shaft member 103 is provided at an upper portion of the operation panel 102 and inserted in the groove 104. That is, the operation panel 102 moves as the shaft member 103 moves in the groove 104.

The groove 104 is shaped into substantially L shape, and is continuously formed with a first guide passage 104a formed to vertically extend on a front side of the case body 101 and a second guide passage 104b formed to extend backward from a lower end of the first guide passage 104a. In this embodiment, each of the first guide passage 104a and the second guide passage 104b is formed into substantially a straight line.

The driving mechanism has a slider 105 as a panel driving member that transmits a driving force to the operation panel 102. The slider 105 is formed to extend forward and backward, and its front end is pivotably coupled to a lower end of the operation panel 102 via a drive shaft 105a.

A guide passage switching mechanism is provided that selectively controls entrance of the shaft member 103 into the first guide passage 104a and the second guide passage 104b.

The guide passage switching mechanism has a substantially semicircular lever 106 as a control member, which pivots to selectively control the guide passages 104a, 104b. The lever 106 oscillates around the vicinity of a corner of the groove 104 to control entrance of the shaft member 103 into the second guide passage 104b when positioned with its circular portion on the right, and control entrance of the shaft member 103 into the first guide passage 104a when positioned with its circular portion upwardly.

Operations when successively moving the operation panel 102 from the operation state to the EJECT state, and to the OFF state in the case body with a front panel configured as described above will be described.

In the operation state in FIG. 7, the DC motor is actuated to cause the slider 105 to move forward, and thereby cause the shaft member 103 of the operation panel 102 to move downward in the first guide passage 104a. At this time, relative positions between the shaft member 103 in the operation panel 102 and the drive shaft 105a are changed to cause the operation panel 102 to pivot. Therefore, when the shaft member 103 reaches the other end of the first guide passage 104a, the upper side of the operation panel 102 moves downward to cause its lower side to project forward, and the operation panel 102 enters the EJECT state where it becomes substantially horizontal as shown in FIG. 8. At this time, the lever 106 controls entrance of the shaft member 103 into the second guide passage 104b.

When the operation panel 102 is moved from the EJECT state to the OFF state, the lever 106 is pivoted to release the control of the entrance of the shaft member 103 into the second guide passage 104b, and to control entrance of the shaft member 103 into the first guide passage 104a. When the DC motor is actuated in this state, the slider 105 moves backward, and the shaft member 103 of the operation panel 102 moves downward in the second guide passage 104b. At this time, the relative positions between the shaft member 103 in the operation panel 102 and the slider 105 do not change to cause the operation panel 102 to substantially horizontally move backward. Thus, as shown in FIG. 9, the operation panel 102 enters the OFF state where it is substantially horizontally held in the case body 101 at the lower end thereof.

As described above, according to the case body with a front panel of the second embodiment, the guide passage switching mechanism is provided that selectively controls the entrance of the shaft member 103 into the guide passages 104a, 104b, and thus the panel can be surely moved from the operation state to the EJECT state, and from the EJECT state to the OFF state.

One lever 106 selectively controls the guide passages 104a, 104b, thereby allowing reduction in a component count and thus reduction in manufacturing cost.

Simply moving the slider 105 forward and backward allows the operation panel 102 to be successively moved from the operation state to the EJECT state, and to the OFF state, thereby achieving a simplified structure, reduction in manufacturing cost and improved reliability.

The present invention is not limited to the first and second embodiments, but it is intended to embrace variation and improvement within a scope where the object of the present invention can be attained.

As described above in detail, according to the first aspect of the present invention, there is no need for providing a gear that pivots a panel as is conventional, and no need for moving a driving mechanism having the gear forward and backward, thereby achieving an especially simplified structure and thus reduction in manufacturing cost. Further, there is no need for securing a space for forward and backward movement of the driving mechanism in the case body to thereby allow a space in the case body to be effectively used.

According to the second aspect of the present invention, in addition to an advantage in the first aspect, the panel can be surely moved from the first state to the second state, and from the second state to the third state.

According to the third aspect of the present invention, in addition to an advantage in the second aspect, the driving mechanism for the panel can be also used as the mechanism for driving the control member to result in reduction in a component count and thus reduction in manufacturing cost. Further, switching of the guide passages by the control member can be synchronized with movement of the shaft member from the first guide passage to the second guide passage, thereby assuring exact timing of switching of the guide passages.

According to the fourth aspect of the present invention, in addition to an advantage of any one of the first to third aspects, movement of the panel driving member is reduced, and thus there is no need for securing a large space for movement of the panel driving member in the case body, thereby allowing the space in the case body to be further effectively used.

According to the fifth aspect of the present invention, in addition to an advantage in the fourth aspect, the panel can be surely and smoothly moved.

According to the sixth aspect of the present invention, the panel can be continuously and surely moved from the first state to the third state. Further, there can be achieved an especially simplified structure compared to a conventional structure and thus reduction in manufacturing cost, and there is no need for securing a space for movement of the driving mechanism in the case body to thereby allow a space in the case body to be effectively used.

According to the seventh aspect of the present invention, a space required for operation of the driving means in the case body can be reduced to allow a limited space in the case body to be effectively used, thereby providing significant advantages in practical use such as a larger capacity of the case body for recording media.

What is claimed is:

1. A case body with a front panel comprising:
   a box-like case body;
   a panel provided on a front side of the case body;
   a shaft member provided on the panel;
   a groove provided on said case body and guiding said shaft member; and
   driving means provided in said case body,
   said driving means being actuated to thereby cause an attitude of the panel to be successively changed from a first state where said panel is substantially parallel to a front surface of the case body, to a second state where one end of the panel moves to the other end of the case body in a vertical direction to cause the panel to substantially horizontally project forward from the other end of the case body, and to a third state where top and bottom as well as inside and outside of the panel are reversed to the first state,
   wherein said driving means has a panel driving member pivotably coupled to the panel via a drive shaft in a position remote from said shaft member,
   driving said panel driving member causes said drive shaft to move and also causes said shaft member to move in said groove to pivot said panel, and
   said groove is continuously formed with a first guide passage guiding said shaft member so as to move said panel from the first state to the second state, and a second guide passage guiding said shaft member so as to move said panel from the second state to the third state.

2. The case body with a front panel according to claim 1, wherein a guide passage switching mechanism is provided that controls entrance of said shaft member into said second guide passage when said panel moves from the first state to the second state, and that controls entrance of said shaft member into the first guide passage when the panel moves from the second state to the third state.

3. The case body with a front panel according to claim 2, wherein said guide passage switching mechanism has a control member that controls movement of said shaft member, and wherein said control member is driven by said driving means and controls the entrance of said shaft member into each of said guide passages in an interlocked manner with said panel driving member.

4. The case body with a front panel according to any one of claims 1 to 3, wherein said panel driving member is oscillatably provided, and oscillation of said panel driving member causes said panel to move.

5. The case body with a front panel according to claim 4, wherein said panel driving member oscillates with forward and reverse pivoting in such a manner that the forward pivoting of said panel driving member causes said panel to move from the first to the second state, and that the reverse pivoting of said panel driving member causes said panel to move from the second to the third state.

6. A case body with a front panel comprising:
   a box-like case body;
   a panel provided on a front side of the case body;
   a shaft member provided on the panel;
   a groove provided on said case body front side and guiding said shaft member; and
   driving means provided in said case body,
   said driving means being actuated to thereby cause said panel to substantially vertically move while pivoting, and cause an attitude of the panel to be changed from a first state where said panel is substantially parallel to a front surface of the case body, to a second state where one end of the panel moves to the other end of the case body in a vertical direction to cause the panel to substantially horizontally project forward from the other end of the case body,
   wherein said driving means has a panel driving member pivotably coupled to said panel via drive shaft in a position remote from said shaft member,
   said groove is continuously formed with a first guide passage guiding said shaft member so as to move said panel from the first state to the second state, and a second guide passage guiding said shaft member so as to move said panel from the second state to a third state where said panel is substantially horizontally held in the case body at the other end thereof in a vertical direction, and
   a guide passage switching mechanism is provided that controls entrance of said shaft member into said second guide passage when said panel moves from the first state to the second state, and that controls entrance of said shaft member into said first guide passage when said panel moves from the second state to the third state.

7. An acoustic apparatus for vehicle use using the case body with a front panel according to any one of claim 1-3 or 6, wherein said case body is fixable to a vehicle with its front surface inward, and can hold a recording medium inserted from an insertion port provided on the front surface, and said panel has an operation section and a display section.

* * * * *